(12) United States Patent
Fujimori

(10) Patent No.: US 11,917,406 B2
(45) Date of Patent: Feb. 27, 2024

(54) COMMUNICATION APPARATUS, METHOD OF CONTROLLING COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Yuki Fujimori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 17/315,097

(22) Filed: May 7, 2021

(65) Prior Publication Data

US 2021/0352479 A1 Nov. 11, 2021

(30) Foreign Application Priority Data

May 11, 2020 (JP) .................................. 2020-083366

(51) Int. Cl.
*H04L 9/32* (2006.01)
*H04W 12/04* (2021.01)
*H04W 12/069* (2021.01)
*H04W 12/08* (2021.01)
*H04W 12/50* (2021.01)

(52) U.S. Cl.
CPC ......... *H04W 12/069* (2021.01); *H04W 12/04* (2013.01); *H04W 12/08* (2013.01); *H04W 12/50* (2021.01)

(58) Field of Classification Search
CPC ... H04W 12/069; H04W 12/04; H04W 12/50; H04W 12/08
USPC .......................................................... 713/168
See application file for complete search history.

(56) References Cited

U.S. PATENT DOCUMENTS

2019/0313246 A1* 10/2019 Nix ....................... H04W 12/30
2019/0334892 A1* 10/2019 Goto ................... H04L 63/0869
2019/0373469 A1* 12/2019 Bradley .............. H04W 12/069

FOREIGN PATENT DOCUMENTS

JP 2012-089926 A 5/2012

* cited by examiner

*Primary Examiner* — Jeffrey C Pwu
*Assistant Examiner* — Samuel Ambaye
(74) *Attorney, Agent, or Firm* — Canon U.S.A., Inc. IP Division

(57) ABSTRACT

A communication apparatus accepts an input of a passphrase by a user operation, sets an authentication scheme based on a passphrase length of the passphrase, and performs wireless connection with a partner apparatus using the set authentication scheme, wherein (i) in a case where the passphrase length is within a predetermined range, an authentication scheme of any of WPA (Wi-Fi Protected Access), WPA2, and WPA3, or a combination of at least two of WPA, WPA2, or WPA3, is set, and (ii) otherwise, an authentication scheme of WPA3 is set.

13 Claims, 9 Drawing Sheets

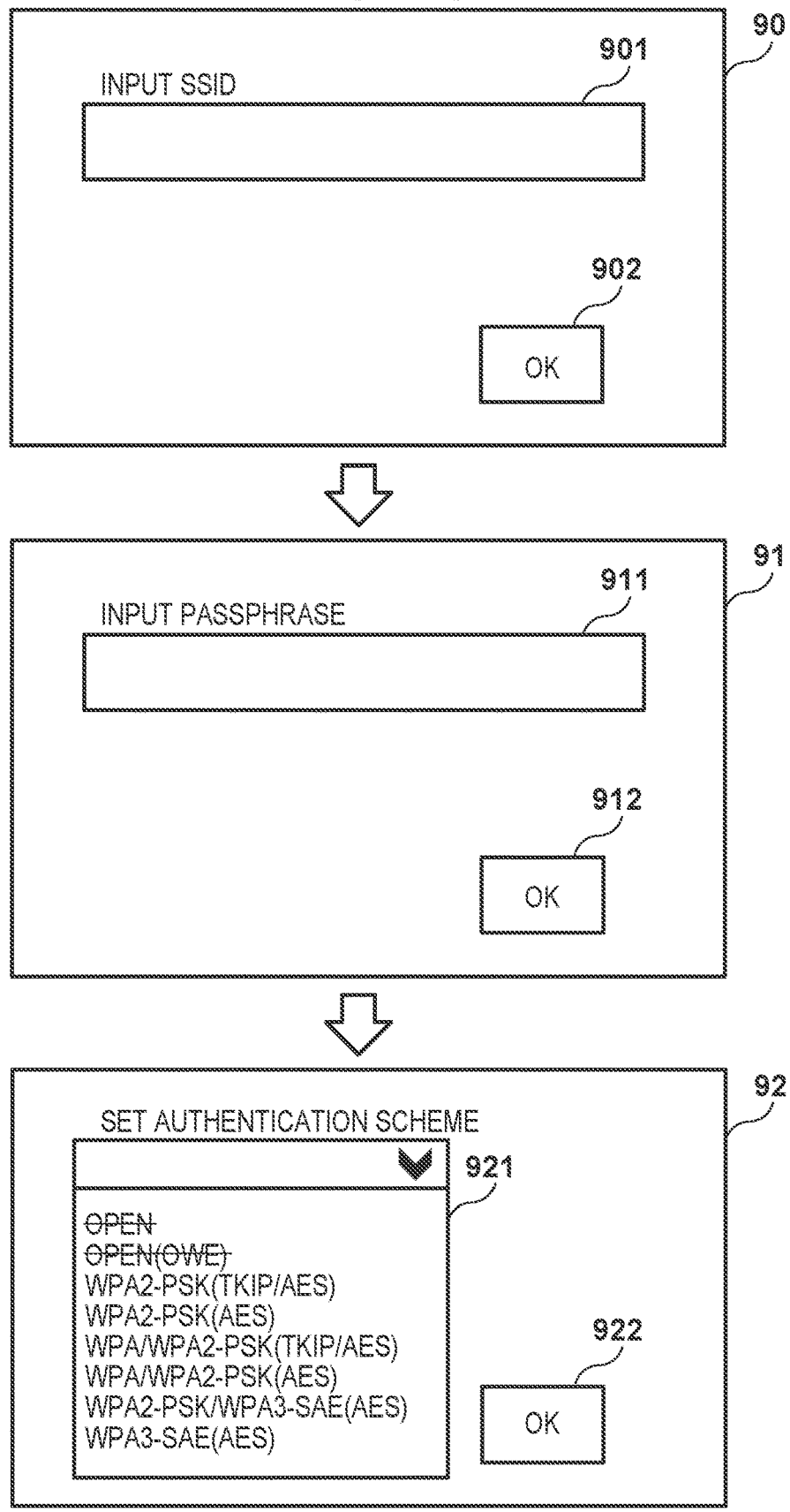

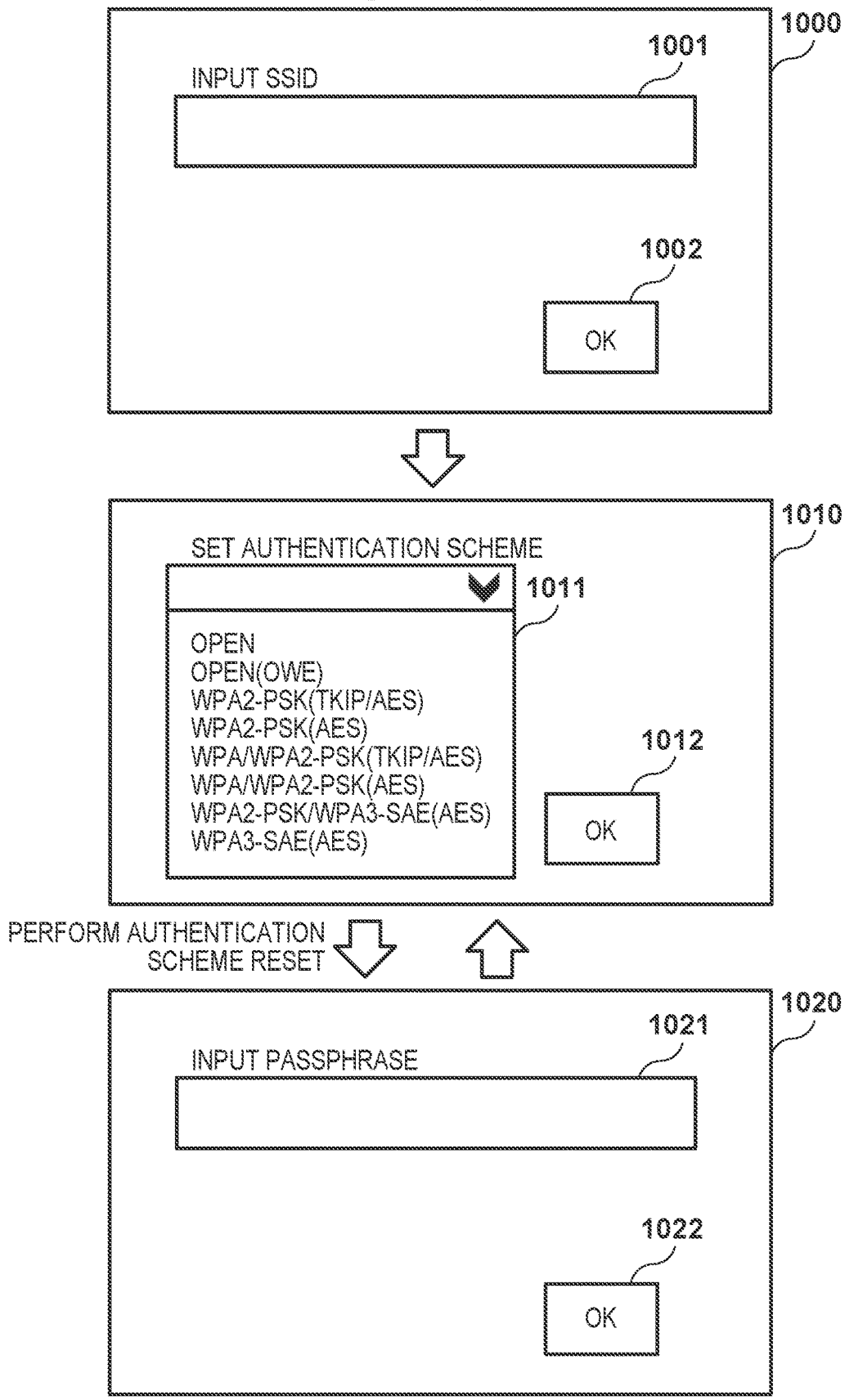

COMMUNICATION APPARATUS, METHOD
OF CONTROLLING COMMUNICATION
APPARATUS, AND NON-TRANSITORY
COMPUTER-READABLE STORAGE
MEDIUM

BACKGROUND

Field

The present disclosure is related to a wireless communication technique.

Description of the Related Art

In recent years, Internet usage has increased year by year together with the development of information communication technologies, and various communication techniques are being developed in response to the increase in demand. Among them, wireless local area network (WLAN) techniques have realized improvements in the throughput of Internet communication of packet data, audio, videos, and the like by mobile terminals, and currently, various techniques are being actively developed (Japanese Patent Laid-Open No. 2012-89926).

In the development of WLAN techniques, the Wi-Fi Alliance, which assures mutual connection between WLAN techniques, has played an important role in much of the standardization work. The importance of security in wireless communication is only increasing, and in recent years, WPA3 was standardized by the Wi-Fi Alliance as an authentication scheme and as a standard subsequent to the conventional WPA (Wi-Fi Protected Access) and WPA2. In the WPA3-Personal standard, similarly to the WPA2-Personal standard, a user sets a passphrase for an AP (access point), and only the STAs (stations/terminal apparatuses) for which the same passphrase has been set will pass the authentication process. Also, security is guaranteed by an AP and an STA apparatus sharing an encryption key with each other in the process of authentication and by data communication being encrypted thereafter.

In WPA3, the specification of limitations related to passphrase length is different from that in WPA and WPA2. Accordingly, there were cases where if the user did not perform passphrase setting while being conscious of the requirements of different authentication schemes (such as WPA, WPA2, WPA3), wireless connection would not be performed properly between partner apparatuses.

SUMMARY

In various embodiments of the present disclosure, a technique for setting an authentication scheme based on a length of a passphrase set by a user is provided.

According to various embodiments of the present disclosure, there is provided a communication apparatus, which includes: an acceptance unit configured to accept an input of a passphrase by a user operation; a setting unit configured to set an authentication scheme based on a passphrase length of the passphrase; and a communication control unit configured to perform wireless connection with a partner apparatus using the set authentication scheme, wherein the setting unit, (i) in a case where the passphrase length is within a predetermined range, sets an authentication scheme of any of WPA (Wi-Fi Protected Access), WPA2, and WPA3, or a combination of at least two of WPA, WPA2, or WPA3, and (ii) otherwise, sets an authentication scheme of WPA3.

Further features of the present disclosure will become apparent from the following description of exemplary embodiments (with reference to the attached drawings).

BRIEF DESCRIPTION OF THE DRAWINGS

FIG. 9 illustrates examples of display screens by the second embodiment.

FIG. 10 illustrates examples of display screens by the third embodiment.

DESCRIPTION OF THE EMBODIMENTS

Figure 1:
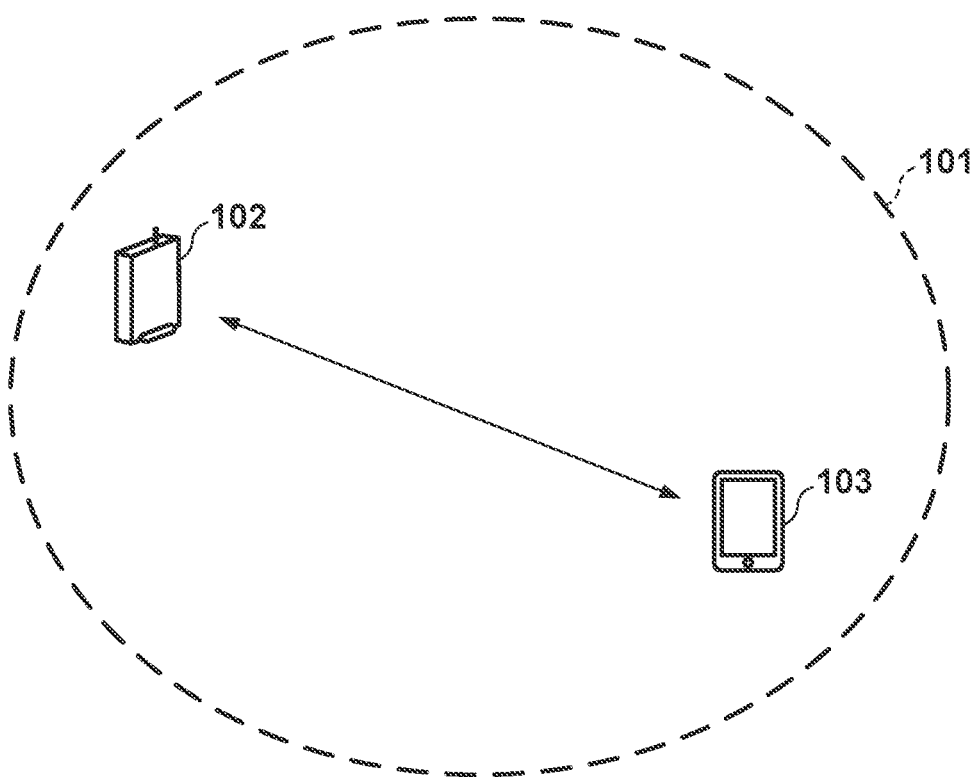
FIG. 1 illustrates an example of a configuration of a communication system.

The following describes embodiments in detail with reference to the accompanying drawings. Note, the following embodiments are not intended to limit the scope of the claimed invention. Although a plurality of features are described in the embodiments, not all the features are essential to the invention and the plurality of features may be combined as appropriate. Furthermore, in the accompanying drawings, the same reference numerals are assigned to the same or similar components, and repetitive description is omitted.

(Configuration of Wireless Communication System)

In FIG. 1, an example of a configuration of a communication system in the present embodiment is illustrated. FIG. 1 illustrates a configuration that includes, as a communication apparatus, one access point (AP 102) and an STA (station/terminal apparatus) (STA 103). As illustrated in FIG. 1, the network that the AP 102 forms is indicated by a circle 101. The STA 103 can transmit/receive a signal that the AP 102 transmits/receives. Note that this drawing is only one example, and what is discussed in the following can be applied, for example, in relation to a network that includes a plurality of communication apparatuses in a wider region or in relation to various positional relationships of communication apparatuses. Also, although an AP (AP 102) is used in the present embodiment, the present invention is not limited to an AP so long as it is a communication apparatus having a function for adjusting a wireless network such as an AP.

(Configuration of STA)

Figure 2:
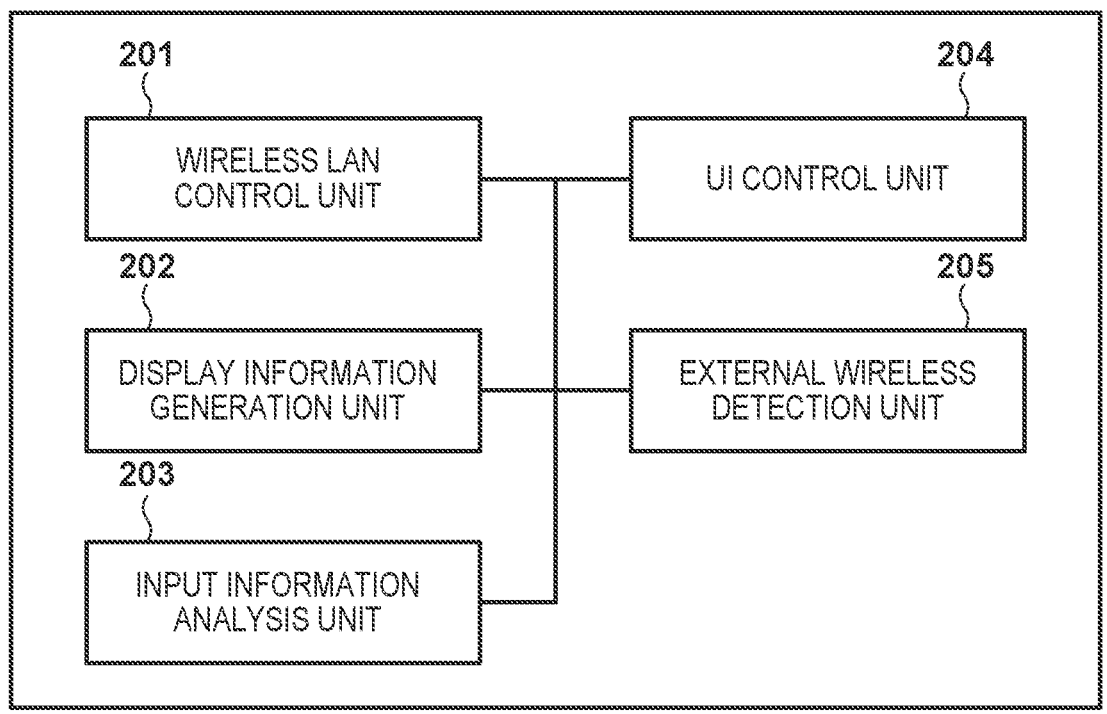
FIG. 2 illustrates an example of a functional configuration of an STA.

FIG. 2 illustrates an example of a functional configuration of the STA 103 according to the present embodiment. The STA 103, as one example of a functional configuration thereof, has a wireless LAN control unit 201, a display information generation unit 202, an input information analysis unit 203, a UI (user interface) control unit 204, and an external wireless detection unit 205.

The wireless LAN control unit 201 is configured to include an antenna and a circuit for performing transmission/reception of wireless signals to and from other wireless LAN apparatuses and programs to control the antenna and the circuit. The wireless LAN control unit 201 executes control of wireless LAN communication in accordance with the IEEE 802.11 standard series. The number of wireless LAN control units is not limited to one and may be two or more.

Figure 3:
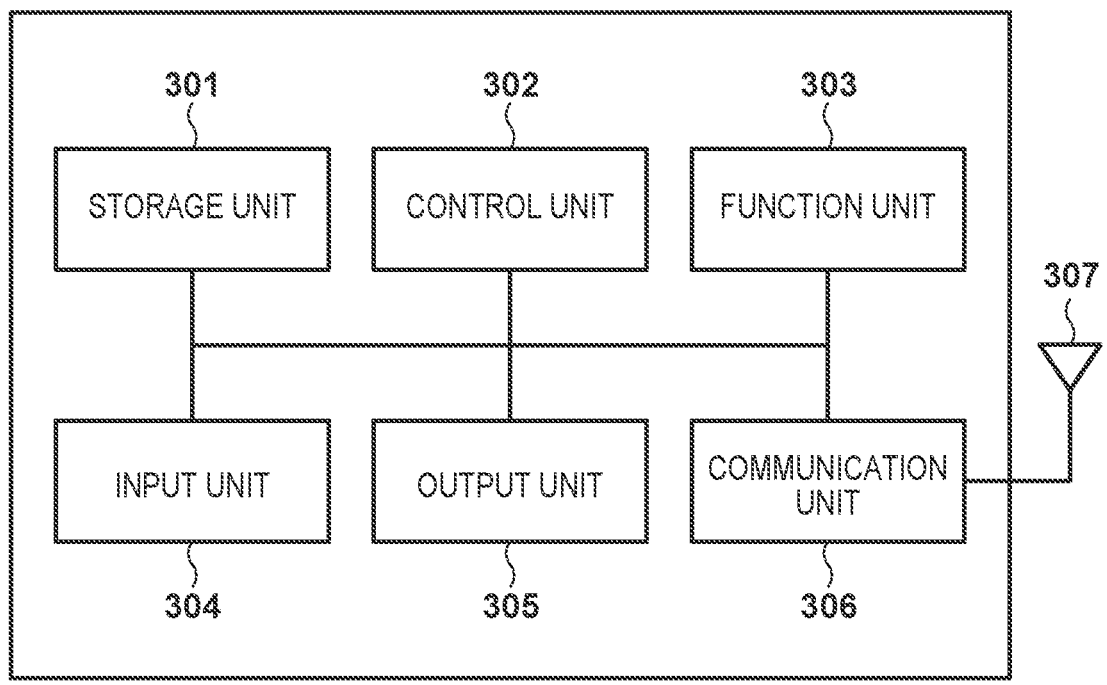
FIG. 3 illustrates an example of a hardware configuration of the STA.

The UI control unit 204 is configured to include hardware that is related to a user interface such as a touch panel and buttons for accepting (receiving) operations that are related to the STA 103 by a user of the STA 103 and programs that control (acceptance/display control) the hardware. By a program of the UI control unit 204, input content from the user acquired from an input unit 304 (FIG. 3) is sent to the input information analysis unit 203. Also, by a program of the UI control unit 204, display information (image information) generated in the display information generation unit 202 is sent to an output unit 305 (FIG. 3). In addition, the UI control unit 204 has a function for presenting to the user information such as an audio output.

The input information analysis unit 203 receives information inputted by the user via the UI control unit 204 and then performs analysis. For example, the input information analysis unit 203 analyzes content to be controlled in the wireless LAN control unit 201 and extracts information for the display information generation unit 202 to generate. The extracted information is sent to the display information generation unit 202.

The display information generation unit 202 generates information (display information, image information) to output (display) to the output unit 305. For example, the display information generation unit 202 generates information to output (display) to the output unit 305 from the information received from the input information analysis unit 203 and information in a storage unit 301 (FIG. 3) and then sends the result to the UI control unit 204. The information to be generated in the display information generation unit 202 can change due to a user input or the passing of time.

The external wireless detection unit 205 is configured to include a program that detects signals that other wireless systems transmit on a designated frequency. The other wireless systems are, for example, fixed wireless and/or satellite communication but are not limited to these. Broadcast communication can also be included.

In FIG. 3, a hardware configuration of the STA 103 according to the present embodiment is illustrated. The STA 103, as one example of a hardware configuration thereof, has the storage unit 301, a control unit 302, a function unit 303, the input unit 304, the output unit 305, a communication unit 306, and a wireless antenna 307.

The storage unit 301 is configured by both or either one of a ROM (Read Only Memory) and a RAM (Random Access Memory) and stores programs for performing various kinds of operations to be described later and various kinds of information such as communication parameters for wireless communication. Note that, other than memories such as a ROM and a RAM, a storage medium such as a flexible disk, a hard disk, an optical disc, a magneto-optical disc, a CD-ROM, a CD-R, a magnetic tape, a nonvolatile memory card, or a DVD may be used as the storage unit 301.

The control unit 302 is configured by, for example, a processor such as a CPU (Central Processing Unit) or an MPU (Micro Processing Unit), an ASIC (application specific integrated circuit), a DSP (Digital Signal Processor), an FPGA (field-programmable gate array), or the like. The control unit 302 controls the entire STA 103 by executing the programs stored in the storage unit 301. Note that configuration may be taken such that the control unit 302 controls the entire STA 103 by the programs and an OS (Operating System) stored in the storage unit 301 cooperating.

Also, the control unit 302, by controlling the function unit 303, executes predetermined processing such as image capturing, printing, and projection. The function unit 303 is hardware for the STA 103 to execute the predetermined processing. For example, in a case where the STA 103 is a camera, the function unit 303 is an image capturing unit and performs image capturing processing. Also, for example, in a case where the STA 103 is a printer, the function unit 303 is a print unit and performs print processing. Also, for example, in a case where the STA 103 is a projector, the function unit 303 is a projection unit and performs projection processing. Data that the function unit 303 processes may be data that is stored in the storage unit 301 or may be data that was communicated to/from another AP via the communication unit 306, which will be described later.

The input unit 304 performs acceptance (reception) of various kinds of operations from the user. Input may be performed by physical mechanisms (such as buttons), buttons displayed on a touch panel, or voice input, and the method is not limited to them so long as it can input information into the apparatus. The output unit 305 performs various kinds of outputs in relation to the user. Here, outputs by the output unit 305 include at least one of displays on a screen (in a case where the output unit 305 functions as a display unit), audio outputs by a speaker, vibratory outputs, and the like, but the method is not limited to them so long as it can present information to the user. Note that configuration may be taken so as to realize both the input unit 304 and the output unit 305 with one module as with a GUI (graphical user interface) such as a touch panel (touch panel display/screen). Also the output unit 305 does not need to be provided in the main body of the STA 103 and may be provided on another device that includes programs that control the output unit and perform display to the user. At this time, PCs, smartphones, and the like that can connect by cable or wireless with the STA 103 are conceivable as output media, but it is not limited to these.

The communication unit 306 performs control of wireless communication and control of IP communication that comply with the IEEE 802.11 standard series. Also, the communication unit 306, by controlling the wireless antenna 307, performs transmission/reception of wireless signals for wireless communication. The STA 103, via the communication unit 306, communicates with other communication apparatuses, content such as image data, document data, and video data.

The wireless antenna 307 is an antenna that can receive any of sub GHz bands, a 2.4 GHz band, a 3.6 GHZ band, 4.9 and 5 GHz bands, and a 6 GHz band and a 60 GHz band. The wireless antenna 307 may be configured physically by one or more antennas in order to realize MIMO (Multi-Input and Multi-Output) transmission/reception.

(Processing Flow)

Next, a plurality of embodiments will be described for processing to be executed by the STA 103 configured as described above. In the following description, assume that, as a non-limiting example, the input unit 304 and the output unit 305 are configured by one module, as a GUI such as a touch panel.

Figure 4:
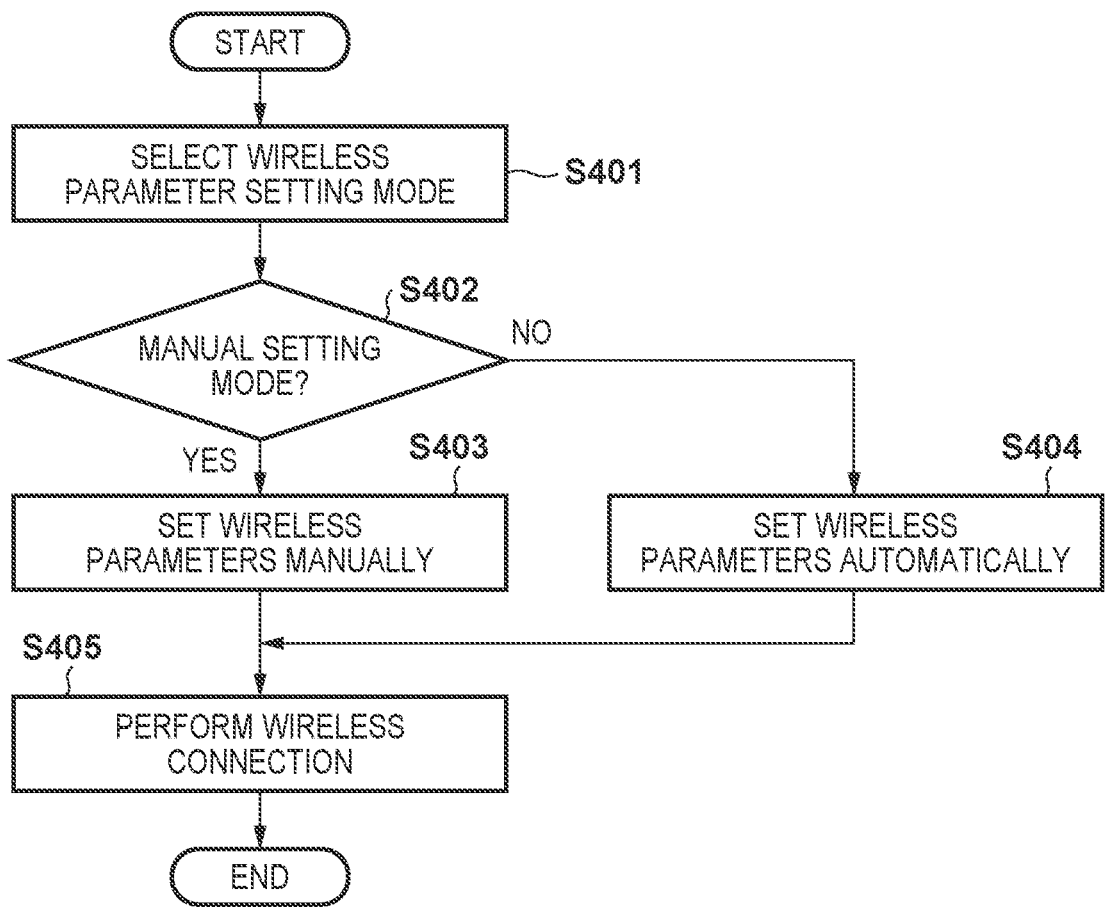
FIG. 4 is a flowchart of processing executed by the STA for wirelessly connecting to an AP.

In FIG. 4, a flowchart of processing up until the STA 103 wirelessly connects to a partner AP 102 is illustrated. In the present embodiment, the STA 103 wirelessly connects to the AP 102 using wireless parameters set by a user input. The processing of FIG. 4 is started when the user of the STA 103 wishes to wirelessly connect the STA 103 in accordance with an operation being performed via a GUI (e.g., a touch panel) by the user. Specifically, it is started, for example, by providing a menu button for activating wireless connection on a GUI of the STA 103 and then the user pressing the menu button.

In step S401, the UI control unit 204, via the GUI, prompts the user to select a wireless parameter setting mode and then accepts (receives) the selection (input) from the user. For example, the UI control unit 204 may control so as to provide, on the GUI, as the wireless parameter setting mode, a menu button whereby a manual setting mode for manually setting each parameter and an automatic setting mode for automatically setting each parameter can be selected. The automatic setting mode may include a mode for selecting an authentication scheme based on a result of a scan, a WPS (PIN/PBC) mode, a DPP mode, and the like. The manual setting mode is particularly necessary when connecting to stealth APs (APs whose stealth AP functions are enabled). In a case where the manual setting mode has been selected in step S401 (Yes in step S402), the processing advances to wireless parameter manual setting processing in step S403. The processing of step S403 will be described later as first to third embodiments using FIGS. 5 to 10. In a case where the automatic setting mode has been selected in step S401 (No in step S402), the processing advances to wireless parameter automatic setting processing in step S404. Because the object of the present embodiment is the manual setting mode, details regarding automatic setting will be omitted. When wireless parameter manual setting (step S403) or wireless parameter automatic setting (step S404) is performed, the wireless LAN control unit 201 of the STA 103, in step S405, performs wireless connection with a partner apparatus using the set wireless parameters.

Next, details of the wireless parameter manual setting processing indicated in step S403 of FIG. 4 will be described in each embodiment using FIGS. 5 to 10. In the wireless parameter manual setting processing, the user of the STA 103 sets, at least manually, an SSID (Service Set Identifier) of connection destination AP (not shown) and a passphrase that is related to an authentication scheme. In addition, although details will not be described in the present embodiment, settings related to wireless communication such as a wireless standard (such as 802.11ac), a wireless channel, a wireless bandwidth, a PMF setting, and an IP address setting may be included in the wireless parameter manual setting. Note that in the first to third embodiments below, similarly to the description for FIG. 4, assume that, as a non-limiting example, the input unit 304 and the output unit 305 are configured by one module, as a GUI such as a touch panel.

First Embodiment

Figure 5:
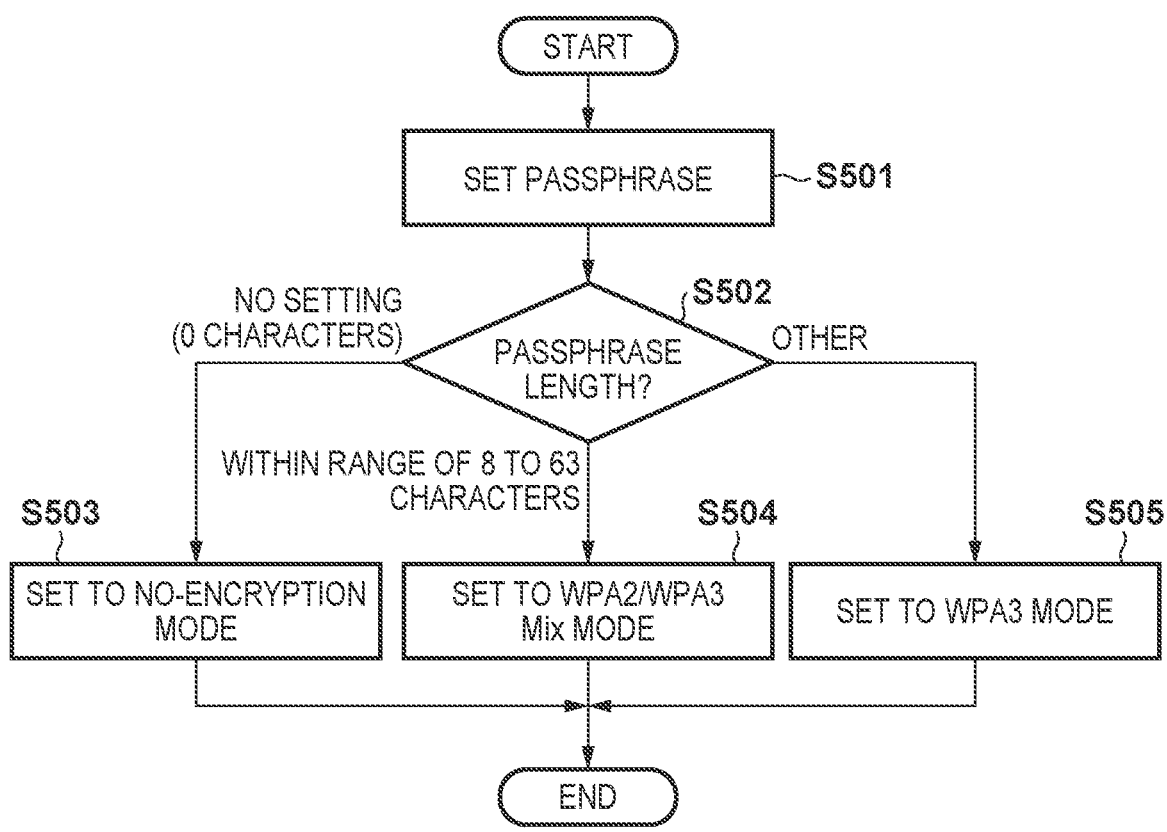
FIG. 5 is a flowchart of processing executed by the STA according to a first embodiment.
Figure 8:
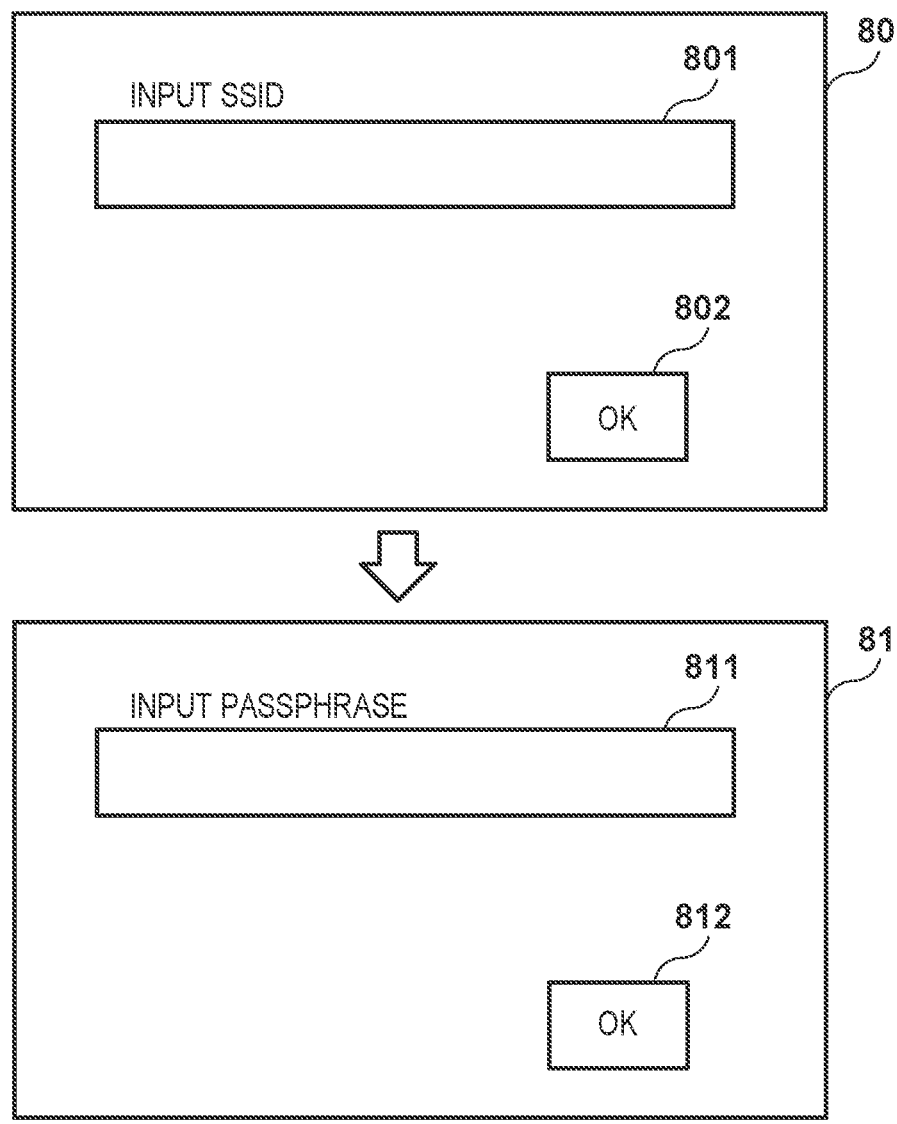
FIG. 8 illustrates examples of display screens by the first embodiment.

The first embodiment will be described using FIG. 5 and FIG. 8. FIG. 5 is a flowchart of processing executed by the STA 103 according to the present embodiment, and FIG. 8 illustrates examples of display screens on a GUI according to the present embodiment. In the present embodiment, the STA 103 automatically sets an authentication scheme to be used in accordance with a length of a passphrase that the user inputs/sets. The flowchart of FIG. 5 is started when the processing in step S403 of FIG. 4 is executed. In the present embodiment, for example, the user of the STA 103 can set wireless parameters via a GUI on which image information generated by the display information generation unit 202 is displayed as illustrated in FIG. 8. The GUI illustrated in the present embodiment (FIG. 8) is merely one example and embodiments of the present disclosure are not limited to the described GUI and may have other features for setting wireless parameters.

First, the UI control unit 204 of the STA 103 controls so as to display a screen 80 on the GUI and then prompts the user to set (input) an SSID (not shown in FIG. 5). For example, in the screen 80, an SSID input box 801 and an OK button 802 are displayed. The user, by a method such as a soft keyboard or voice input, performs input of an SSID into the SSID input box 801 and then a result of the input is displayed. Furthermore, in response to the OK button 802 being selected (pressed) by the user, the SSID is set (decided) to the content inputted into the SSID input box 801.

Then, the UI control unit 204 controls so as to transition to a screen 81 on the GUI and then prompts the user to set (input) a passphrase (step S501). For example, in the screen 81, a passphrase input box 811 and an OK button 812 are displayed. The user, by a method such as a soft keyboard or voice input, performs input of the passphrase into the passphrase input box 811 and then a result of the input is displayed. Furthermore, in response to the OK button 812 being selected by the user, the passphrase is set (decided) to the content inputted into the passphrase input box 811. The input information analysis unit 203 determines a length of the set passphrase (passphrase length) (step S502). In a case where there is no setting of the passphrase length (i.e., 0-character setting), the input information analysis unit 203 sets the authentication scheme to a no-encryption mode (step S503). In a case where the passphrase length is within a range of 8 to 63 characters, the input information analysis unit 203 sets the authentication scheme to a WPA2/WPA3 Mix mode (step S504). Here, the Mix mode will be described. The Mix mode is a mode that can execute authentication processing in accordance with an authentication scheme that a partner apparatus (here, the AP 102) can use. As a specific example, in a case where the WPA2/WPA3 Mix mode is set and the AP 102 does not support WPA3 but supports WPA2, the authentication processing is performed by the AP 102 and WPA2, and in a case where the AP 102 supports WPA3, the authentication processing is performed by the AP 102 and WPA3. In step S504, configuration may be taken so as to set to any of a WPA/WPA2/WPA3 Mix mode, respective single modes (e.g., any of WPA, WPA2, and WPA3) and a Mix mode of at least two of WPA/WPA2/WPA3, and the like. In a case where, in step S504, there are a plurality of authentication modes (authentication schemes) that can be applied, the input information analysis unit 203 may set (decide) an authentication mode to be set from an authentication mode that the STA 103 supports or from a default setting of the user that is related to the STA 103. The default setting of the user may be changeable. In a case where the passphrase length is other than the passphrase lengths described above, the input information analysis unit 203 sets the authentication scheme to a WPA3 mode (step S505). Note that the passphrase length used in the branch in step S502 is one example and may be configured to branch into steps S503, S504, and S505 by another condition for the number of characters.

When setting of the authentication scheme is performed in any of steps S503, S504, and S505, the processing of FIG. 5 is ended. Configuration may be taken such that, before the processing of FIG. 5 is ended, by the display information generation unit 202 generating information that indicates the set authentication scheme and then the UI control unit 204 displaying the information on the GUI, the set authentication scheme is notified to the user. Note that that the order of the SSID setting and the passphrase setting may be inverted and may be configured to first set the passphrase (screen 81) and then set the SSID (screen 80).

Accordingly, by virtue of the present embodiment, the user, by setting only the passphrase without being conscious of the authentication scheme, can set/select an appropriate authentication scheme.

Second Embodiment

Figure 6:
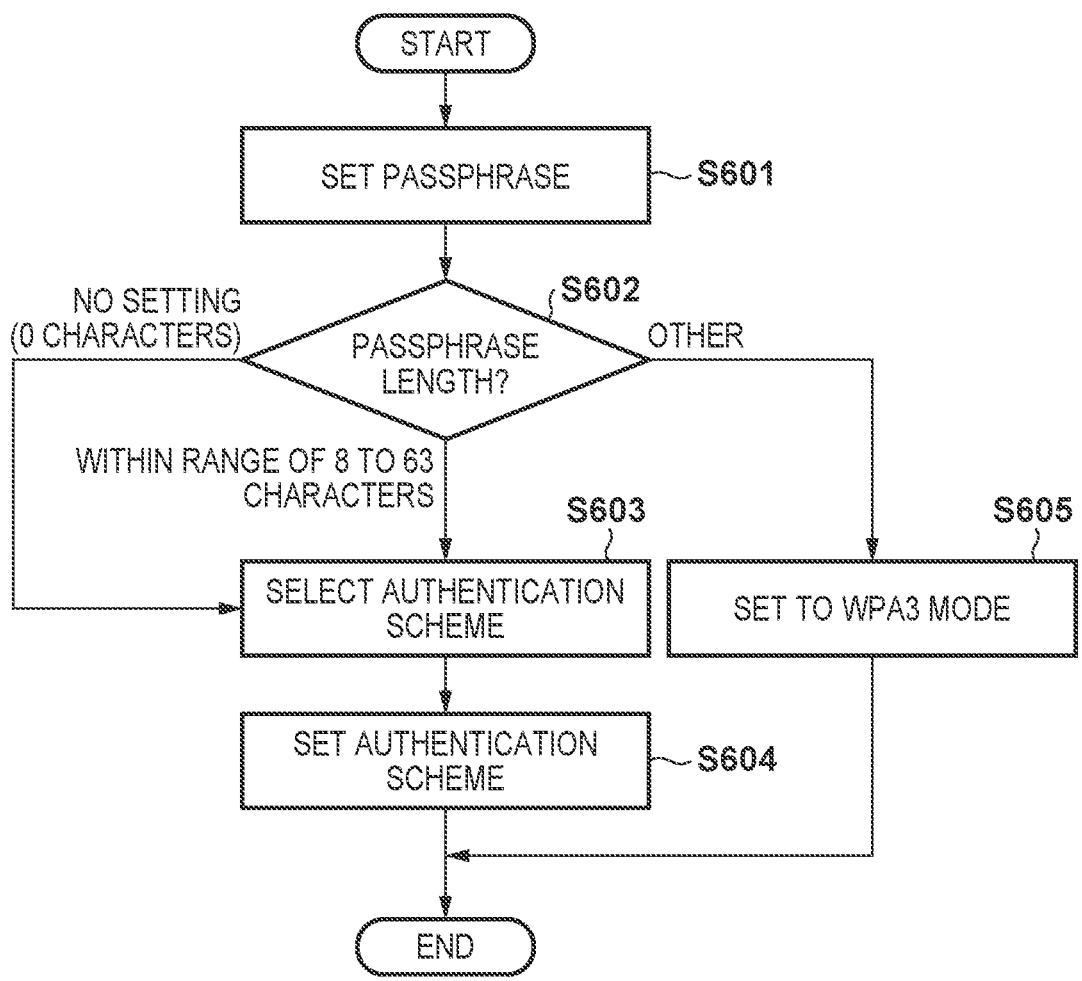
FIG. 6 is a flowchart of processing executed by the STA according to a second embodiment.

The second embodiment will be described using FIG. 6 and FIG. 9. FIG. 6 is a flowchart of processing executed by the STA 103 according to the present embodiment, and FIG. 9 illustrates examples of display screens on a GUI according to the present embodiment. In the present embodiment, the STA 103, in accordance with a length of a passphrase that the user inputs, automatically selects a candidate for an authentication scheme that can be used, and in a case where there are a plurality of candidates, prompts the user to select a candidate, and in a case where there is only one, automatically sets the candidate. The flowchart of FIG. 6 is started when the processing in step S403 of FIG. 4 is executed. In the present embodiment, for example, the user of the STA 103 can set wireless parameters via a GUI on which image information generated by the display information generation unit 202 is displayed as illustrated in FIG. 9. The GUI illustrated in the present embodiment (FIG. 9) is merely one example and embodiments of the present disclosure are not limited to the GUI and may have other features for setting wireless parameters. [0043] Because the processing in steps S601, S602, and S605 in FIG. 6 is the same as the processing in S501, S502, and S505 of FIG. 5 (first embodiment), respectively, description will be omitted. Also, because a screen 90 and a screen 91 in FIG. 9 are the same as the screen 80 (SSID setting) and the screen 81 (passphrase setting (step S501)) of FIG. 8 (first embodiment), respectively, description will be omitted.

In step S602, which is after the SSID setting (screen 90) and the passphrase setting (screen 91), in a case where there is no setting of the passphrase length (i.e., 0-character setting) or in a case where the passphrase length is within a range of 8 to 63 characters, the processing advances to step S603. In step S603, the UI control unit 204 controls so as to display a screen 92 on the GUI and then prompts the user to select the authentication scheme. For example, as indicated in a pull-down menu 921 of the screen 92, configuration may be taken so as to display, in a list format, one or more authentication schemes that can be selected. The user, in accordance with the inputted passphrase length, can select an authentication scheme. The authentication schemes that are displayed in the pull-down menu 921 are one example and other embodiments of the present disclosure may have other authentication schemes displayed. The pull-down menu 921 of the screen 92 is indicating one example of selection candidates for the authentication scheme for a case where a passphrase within a range of 8 to 63 characters has been set in a passphrase input box 911. In the pull-down menu 921, authentication schemes that can be selected are denoted without a strike-through line and authentication schemes that cannot be selected are denoted with a strike-through line. In other words, in the pull-down menu 921, authentication schemes that correspond to the no-encryption (OPEN) mode are denoted with a strike-through line. In response to the user selecting one authentication scheme from among the selectable authentication schemes listed in the pull-down menu 921 and then selecting (pressing) an OK button 922, the authentication scheme is set.

Note that the display method of the GUI of FIG. 9 is merely one example and another display method such as displaying only the selectable authentication schemes or displaying the unselectable authentication schemes in another color may be used. Also, although the processing in FIG. 6 advanced to step S603 even in a case where there is no setting of the passphrase length (i.e., 0-character setting), configuration may be taken in this case to have the no-encryption mode set as the authentication scheme as in step S503 of FIG. 5 (first embodiment). Also, the passphrase length used in the branch in step S602 is only one example and may be configured to branch into steps S603 and S605 by another condition for the number of characters.

When setting of the authentication scheme is performed in any of steps S604 and S605, the processing of FIG. 6 is ended. Configuration may be taken such that, before the processing of FIG. 6 is ended, by the display information generation unit 202 generating information that indicates the set authentication scheme and then the UI control unit 204 displaying the information on the GUI, the set authentication scheme is notified to the user.

Accordingly, by virtue of the present embodiment, the user can select an authentication scheme from among the authentication schemes to which the set passphrase length can be applied, thereby making it easy to select an authentication scheme while making it possible to perform setting/selecting of an authentication scheme that accords to the user's preference.

Third Embodiment

Figure 7:
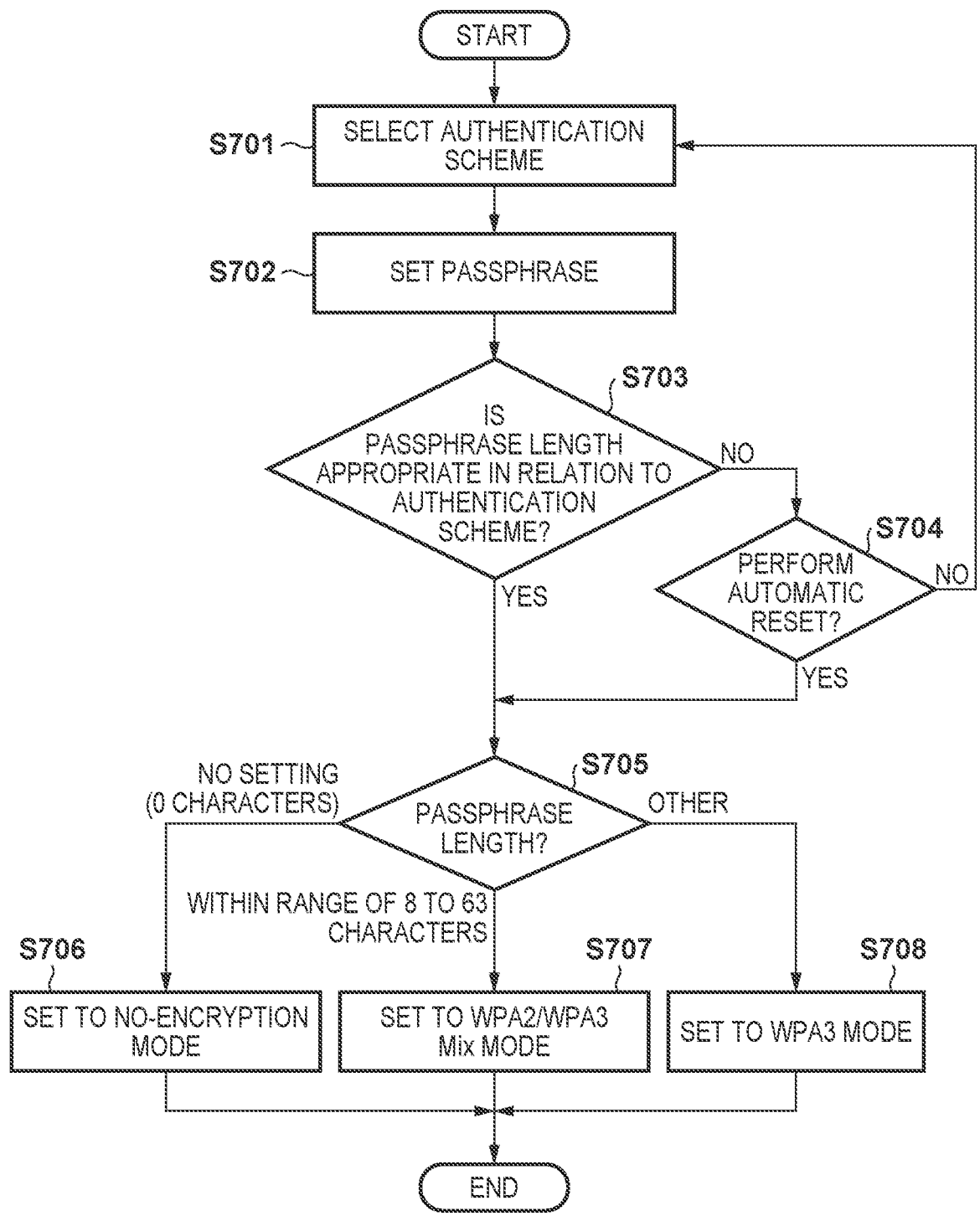
FIG. 7 is a flowchart of processing executed by the STA according to a third embodiment.

The third embodiment will be described using FIG. 7 and FIG. 10. FIG. 7 is a flowchart of processing executed by the STA 103 according to the present embodiment, and FIG. 8 illustrates examples of display screens on a GUI according to the present embodiment. In the present embodiment, the STA 103 automatically sets authentication scheme candidates that can be used in accordance with an authentication scheme that the user selects and a length of a passphrase that the user inputs/sets. In other words, the STA 103, from among the authentication schemes that the user selected, selects an authentication scheme that meets the conditions of the set passphrase length. In a case where there is no authentication scheme that meets the conditions, the STA 103 may perform an automatic reset and may prompt the user to select an appropriate authentication scheme again. Whether or not to perform an automatic reset may be decided in advance within the STA 103 or configuration may be such that this can be set by user input. The flowchart of FIG. 7 is started when the processing in step S403 of FIG. 4 is executed. In the present embodiment, for example, the user of the STA 103 can set wireless parameters via a GUI on which image information generated by the display information generation unit 202 is displayed as illustrated in FIG. 10. The GUI illustrated in the present embodiment (FIG. 10) is merely one example and embodiments of the present disclosure are not limited to the GUI and may have other features for setting wireless parameters.

Because the processing in steps S702, S705, S706, S707 and S708 in FIG. 7 is the same as the processing in S501, S502, S503, S504, and S505 of FIG. 5, respectively, description will be omitted. Also, because a screen 1000 and a screen 1020 in FIG. 10 are the same as the screen 80 (SSID setting) and the screen 81 (passphrase setting (step S501)) of FIG. 8 (first embodiment), respectively, description will be omitted.

In step S701 after the SSID setting (screen 1000), the UI control unit 204 controls so as to display a screen 1010 on the GUI and then prompts the user to select the authentication scheme. Because the state, unlike in the second embodiment, is such that the passphrase is yet to be set by the user, in a pull-down menu 1011 of the screen 1010, a plurality of authentication schemes including the no-encryption (OPEN) mode are displayed so as to be selectable. In response to the user selecting one authentication scheme from among the selectable authentication schemes listed in the pull-down menu 1011 and then selecting (pressing) an OK button 1012, the authentication scheme is set. In a case where the no-encryption (OPEN) mode has been selected by the user, the next processing in step S702 (passphrase setting) may be skipped.

After the passphrase setting (refer to the screen 1020) in step S702, the processing advances to step S703. In step S703, the input information analysis unit 203 confirms the consistency between the authentication scheme set in step S701 and the passphrase length set in step S702 (whether or not the passphrase length is appropriate in relation to the set authentication scheme). In a case where the passphrase length is appropriate (Yes in step S703), the processing advances to step S705, and otherwise (No in step S703), the processing advances to step S704. One example of the consistency between the passphrase length and the authentication scheme (conditions of the passphrase length related to the authentication scheme) is as described below.

No-encryption (OPEN) mode: 0 characters
WPA, WPA2 mode: 8 to 63 characters
Mix mode which uses a combination of at least two of WPA/WPA2/WPA3: 8 to 63 characters
WPA3: No limitation Note that in the WPA and WPA2 modes and the Mix mode of these, a 64-character PSK (Pre-Shared Key) can be set. Accordingly, in a case where the passphrase length is 64 characters, the UI control unit 204 may perform, on the GUI, a display for prompting the user to select whether to handle it as a PSK or to handle it as a passphrase of WPA3. Then, in accordance with the selection of the user related to the display, the input information analysis unit 203, in step S708, may set the authentication scheme (not shown).

In a case where the passphrase length was not appropriate in relation to the set authentication scheme (in a case where the passphrase length does not meet the conditions of the passphrase length related to the set authentication scheme), (No in step S703), the STA 103, in step S704, determines whether or not to perform an automatic reset. Whether or not to perform an automatic reset may be determined, for example, by any of the following methods.

Whether or not to perform an automatic reset is preset by the STA 103
Whether or not to perform an automatic reset is set in advance on the STA 103 by the user
In a case where No in step S703, whether to perform an automatic reset is selected by the user In a case where an automatic reset is not performed (No in step S704), the processing returns to step S701, and the UI control unit 204 prompts the user to select the authentication scheme again (refer to the screen 1010). At this time, the UI control unit 204, on the GUI, may display a warning to the user that the passphrase length is not appropriate in relation to the authentication scheme (not shown). In a case where an automatic reset is performed (Yes in step S704), the processing advances to step S705. Here, the UI control unit 204, on the GUI, may display a warning to the user that the passphrase length is not appropriate in relation to the authentication scheme and that an automatic reset is performed (the authentication scheme that supports the passphrase length is automatically reset) together with the reset authentication scheme (not shown). In a case where the passphrase length set by the user is not appropriate in relation to the authentication scheme and an automatic reset is performed, the processing does not return to the screen 1010 from the screen 1020, and, after the processing in steps S705 to S708, advances to wireless connection (step S405). At this time, the UI control unit 204, on the GUI, may display a warning to the user that the passphrase length was not appropriate in relation to the authentication scheme but that an automatic reset has been performed together with the reset authentication scheme (not shown).

Note that the display method of the GUI of FIG. 10 is merely one example and another display method such as displaying only the selectable authentication schemes or displaying the unselectable authentication schemes in another color may be used. Note that the passphrase length used in the branch in step S705 is one example and may be configured to branch into steps S706, S707, and S708 by another condition for the number of characters.

When setting of the authentication scheme is performed in any of steps S706, S707, and S708, the processing of FIG. 7 is ended. Configuration may be taken such that, before the processing of FIG. 7 is ended, by the display information generation unit 202 generating information that indicates the set authentication scheme and then the UI control unit 204 displaying the information on the GUI, the set authentication scheme is notified to the user.

Accordingly, by virtue of the present embodiment, the user can select the authentication scheme that he/she wishes to use while confirming its consistency with the passphrase length, thereby enabling the selection of the authentication scheme to be easy.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-083366, filed May 11, 2020, which is hereby incorporated by reference herein in its entirety.

What is claimed is:

1. A communication apparatus comprising:
   one or more processors; and
   one or more memories that store a computer-readable instruction for causing, when executed by the one or more processors, the communication apparatus to:
   accept an input of a passphrase by a user operation;
   set an authentication scheme based on a passphrase length of the passphrase, wherein the passphrase length is the number of characters in the passphrase,
   wherein in a case where the passphrase length is within a predetermined range and no more than 63 characters, a user selected authentication scheme corresponding to an item selected by a user operation from among a plurality of items containing at least WPA (Wi-Fi Protected Access), WPA2, and WPA3, or a combination of at least two of WPA, WPA2, and WPA3 is set as the authentication scheme, and
   wherein in a case where the passphrase length greater than 63 characters, WPA3 is automatically set as the authentication scheme; and
   perform wireless connection with a partner apparatus using the set authentication scheme.

2. The communication apparatus according to claim 1, wherein in a case where the passphrase length is 0, a no-encryption mode is set as the authentication scheme.

3. The communication apparatus according to claim 1, wherein in a case where the passphrase length is within the predetermined range, any of WPA, WPA2, and WPA3, or a combination of at least two of WPA, WPA2, or WPA3 is set by a user operation as the authentication scheme.

4. The communication apparatus according to claim 1, wherein the predetermined range is a range of 8 to 63 characters.

5. A method for controlling a communication apparatus, the method comprising:
   setting an authentication scheme based on a passphrase length of a passphrase inputted by a user operation, wherein the passphrase length is the number of characters in the passphrase,
   wherein in a case where the passphrase length is within a predetermined range and no more than 63 characters, a user selected authentication scheme corresponding to an item selected by a user operation from among a plurality of items containing at least WPA (Wi-Fi Protected Access), WPA2, and WPA3, or a combination of at least two of WPA, WPA2, and WPA3 is set as the authentication scheme, and
   wherein in a case where the passphrase length greater than 63 characters, WPA3 is automatically set as the authentication scheme; and
   performing communication control for performing wireless connection with a partner apparatus using the set authentication scheme.

6. A non-transitory computer-readable storage medium storing a computer program for causing a computer to execute a method of controlling a communication apparatus, the method comprising:
   setting an authentication scheme based on a passphrase length of a passphrase inputted by a user operation, wherein the passphrase length is the number of characters in the passphrase,
   wherein in a case where the passphrase length is within a predetermined range and no more than 63 characters, a user selected authentication scheme corresponding to an item selected by a user operation from among a plurality of items containing at least WPA (Wi-Fi Protected Access), WPA2, and WPA3, or a combination of at least two of WPA, WPA2, and WPA3 is set as the authentication scheme, and
   wherein in a case where the passphrase length greater than 63 characters, WPA3 is automatically set as the authentication scheme; and
   performing communication control for performing wireless connection with a partner apparatus using the set authentication scheme.

7. A communication apparatus comprising:
   one or more processors; and
   one or more memories that store a computer-readable instruction for causing, when executed by the one or more processors, the communication apparatus to:
   accept an input of an authentication scheme and a passphrase by a user operation;
   determine whether or not a passphrase length of the inputted passphrase meets a condition of a passphrase length related to the inputted authentication scheme, wherein the passphrase length is the number of characters in the passphrase;
   in a case where the passphrase length does not meet the condition, set an authentication scheme that supports the passphrase length, and perform wireless connection with a partner apparatus using the set authentication scheme; and
   in a case where the passphrase length does not meet the condition and the passphrase length is within a predetermined range and no more than 63 characters, a user selected authentication scheme corresponding to an item selected by user operation from among a plurality of items containing at least WPA (Wi-Fi Protected Access), WPA2, WPA3, or a combination of at least two of WPA, WPA2, and WPA3 is set as the authentication scheme, and perform wireless connection with a partner apparatus using the set authentication scheme,
   in a case where the passphrase length meets the condition, perform wireless connection with a partner apparatus using the inputted authentication scheme.

8. The communication apparatus according to claim 7, wherein the computer-readable instruction causes, when executed by the one or more processors, the communication apparatus to, in a case where the passphrase length does not meet the condition, display, on a display, information indicating at least one of (i) that the passphrase length is not appropriate or (ii) that an authentication scheme that supports the passphrase length has been set.

9. The communication apparatus according to claim 7, wherein in a case where the passphrase length is 0, a no-encryption mode is set as the authentication scheme, and (i) in a case where the passphrase length is within a predetermined range and no more than 63 characters, any of WPA (Wi-Fi Protected Access) WPA2, WPA3, or a combination of at least two of WPA, WPA2, orWPA3 is set as the authentication scheme, and (ii) wherein in a case where the passphrase length greater than 63 characters, WPA3 is automatically set as the authentication scheme.

10. The communication apparatus according to claim 9, wherein in a case where the passphrase length is within the predetermined range, any of WPA, WPA2, and WPA3, or a combination of at least two of WPA, WPA2, orWPA3 is set by a user operation as the authentication scheme.

11. The communication apparatus according to claim 9, wherein the predetermined range is a range of 8 to 63 characters.

12. A method for controlling a communication apparatus, the method comprising:
   accepting an input of an authentication scheme and a passphrase by a user operation;
   determining whether or not a passphrase length of the inputted passphrase meets a condition of a passphrase length related to the inputted authentication scheme, wherein the passphrase length is the number of characters in the passphrase;
   setting, in a case where the passphrase length does not meet the condition, an authentication scheme that supports the passphrase length, and perform wireless connection with a partner apparatus using the set authentication scheme, wherein in a case where the passphrase length does not meet the condition and the passphrase length is within a predetermined range and no more than 63 characters, a user selected authentication scheme corresponding to an item selected by user operation from among a plurality of items containing at least WPA (Wi-Fi Protected Access), WPA2, WPA3, or a combination of at least two of WPA, WPA2, and WPA3 is set as the authentication scheme, and perform wireless connection with a partner apparatus using the set authentication scheme; and
   performing communication control for performing wireless connection with a partner apparatus, in a case where the passphrase length meets the condition, using the inputted authentication scheme.

13. A non-transitory computer-readable storage medium storing a computer program for causing a computer to execute a method of controlling a communication apparatus, the method comprising:
   accepting an input of an authentication scheme and a passphrase by a user operation;
   determining whether or not a passphrase length of the inputted passphrase meets a condition of a passphrase length related to the inputted authentication scheme, wherein the passphrase length is the number of characters in the passphrase;
   setting, in a case where the passphrase length does not meet the condition, an authentication scheme that supports the passphrase length, and perform wireless connection with a partner apparatus using the set authentication scheme, wherein in a case where the passphrase length does not meet the condition and the passphrase length is within a predetermined range and no more than 63 characters, a user selected authentication scheme corresponding to an item selected by user operation from among a plurality of items containing at least WPA (Wi-Fi Protected Access), WPA2, WPA3, or a combination of at least two of WPA, WPA2, and WPA3 is set as the authentication scheme, and perform wireless connection with a partner apparatus using the set authentication scheme; and
   performing communication control for performing wireless connection with a partner apparatus, in a case where the passphrase length meets the condition, using the inputted authentication scheme.

* * * * *